(12) United States Patent
Zhao

(10) Patent No.: US 8,983,457 B2
(45) Date of Patent: Mar. 17, 2015

(54) POLICY CONTROL ARCHITECTURE COMPRISING AN INDEPENDENT IDENTITY PROVIDER

(75) Inventor: Wei Zhao, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1337 days.

(21) Appl. No.: 12/442,743

(22) PCT Filed: Sep. 26, 2006

(86) PCT No.: PCT/SE2006/001093
§ 371 (c)(1),
(2), (4) Date: Mar. 25, 2009

(87) PCT Pub. No.: WO2008/039114
PCT Pub. Date: Apr. 3, 2008

(65) Prior Publication Data
US 2010/0095003 A1    Apr. 15, 2010

(51) Int. Cl.
*H04W 4/00* (2009.01)
*H04W 36/00* (2009.01)
*H04L 29/06* (2006.01)
*H04W 12/08* (2009.01)
*H04W 8/08* (2009.01)

(52) U.S. Cl.
CPC ............ *H04L 63/102* (2013.01); *H04W 12/08* (2013.01); *H04W 8/08* (2013.01)
USPC ......... 455/432.3; 455/433; 455/436; 370/331

(58) Field of Classification Search
CPC ... H04L 12/244; H04L 41/0893; H04L 63/10; H04L 63/102; H04L 63/104; H04L 63/107; H04W 4/00; H04W 4/001; H04W 8/08; H04W 8/12; H04W 8/18; H04W 8/20; H04W 12/00; H04W 12/06; H04W 12/08; H04M 3/4217; H04M 3/42229; H04M 3/42272; H04M 7/00
USPC ........................ 455/414.1–414.2, 432.1–444, 455/456.1–456.3; 370/331; 709/221–228
See application file for complete search history.

(56) References Cited

U.S. PATENT DOCUMENTS

| | | |
|---|---|---|
| 6,697,620 B1 | 2/2004 | Lamb |
| 2003/0004880 A1 | 1/2003 | Banerjee |
| 2003/0149781 A1 | 8/2003 | Yared |
| 2004/0162068 A1* | 8/2004 | Lamb et al. ................ 455/432.1 |
| 2005/0228893 A1* | 10/2005 | Devarapalli et al. .......... 709/228 |
| 2005/0276229 A1* | 12/2005 | Torabi ........................... 370/252 |

OTHER PUBLICATIONS

ETSI ES 282 003 V1.1.1 (Jun. 2006); Telecommunications and Internet converged Services and Protocols for Advanced Networking (TISPAN); Resource and Admission Control Sub-system (RACS); Functional Architecture; 650 Route des Lucioles, F-06921 Sophia Antipolis Cedex—France.

(Continued)

Primary Examiner — Michael Mapa

(57) ABSTRACT

A policy control architecture for handling policies in communication networks. An independent Identity Provider (IDP) generates IDP user terminal entries for policy control information. Policy controllers are logically divided into separate policy control units. Of these, a User Policy Controller (UPC) generates UPC user terminal entries for service subscriptions, and a Business Policy Controller (BPC) applies related policies on the services.

14 Claims, 5 Drawing Sheets

(56) References Cited

OTHER PUBLICATIONS

3G00 TR 23.803 V2.0.0 (Sep. 2005); 3rd Generation Partnership Project; Technical Specification Group Services and System Aspects; Evolution of Policy Control and Charging (Release 7); 650 Route des Lucioles, Sophia Antipolis Valbonne—France.

3GPP TS 23.203 V1.0.0 (May 2006); 3rd Generation Partnership Project; Technical Specification Group Services and System Aspects; Policy and charging control architecture (Release 7); 650 Route des Lucioles, Sophia Antipolis Valbonne—France.

* cited by examiner

POLICY CONTROL ARCHITECTURE COMPRISING AN INDEPENDENT IDENTITY PROVIDER

TECHNICAL FIELD

The present invention relates to a policy control architecture enabling policy controller discovery between different types of access networks, in particular to support roaming. The present invention also relates to an independent Identity Provider, a User policy controller and a Business policy controller for said policy control architecture, as well as to methods in a user terminal, in an Identity provider, in a User policy controller, in a Business policy controller, in a Service policy controller and in a Network policy controller within such a policy control architecture.

BACKGROUND

The integration of wireline and wireless technologies in order to create a common telecommunication network foundation may be referred to as Fixed-Mobile Convergence, FMC, enabling wireline service providers and wireless network operators to use the same physical infrastructure, involving several advantages for the end users, as well as to the service providers and operators. An end user may access wireline and wireless services by the same user terminal, such as a mobile phone or a personal computer, and fixed and mobile services may be offered to the end user in one package.

Within the technical field related to FMC, the policy control architecture plays a vital role, e.g. regarding roaming support and QoS (Quality of Service). Currently, one object of various standardization bodies, such as the 3GPP PCC work-item, the Tispan RACS, the WiMax Forum and the DSL Forum is to agree on a policy control architecture specification, providing a common policy control architecture that is applicable regardless of the access network type. However, several technical problems still need to be solved, the mapping and aligning is far from complete, and the different organizations propose different solutions. The TISPAN and the DSL Forum (DSLF) both have a focus on the fixed access-side, which typically is more influenced by the so called "equal-access" concept. Therefore, they propose a distributed policy control architecture, while the 3GPP ($3^{rd}$ Generation Partnership Project), which relates to radio access networks, prefers a more enclosed policy control architecture, since the mobile/cellular network operators conventionally prefer to give services mainly to their own subscribers. For instance, in DSLF, a PDP (policy decision point) is separated into three parts, an SPC (service policy controller), an NPC (network policy controller) and a UPC (user policy controller), while the policy controlling functions normally are closely coupled in the 3GPP, e.g. according to the PCRF (combined Policy and Charging Rules Functions), which allows rule management of service flow response, gating, QoS and flow based charging independently of the subscriber access technology.

However, in order to allow an end user to move freely from one network to another, of which one of the networks may be a fixed (wireline or wireless) network and the other a radio access network, while the end user at least partly retains his subscribed services, a policy controller in one network must be able to discover its peering policy controller in the other network, and any roaming agreement between the two parties must be detected and retrieved. These objects are not achieved by any existing solution today.

Roaming refers to the extension of a service to a different location than the home location where the service was registered, by means of a roaming agreement. Roaming occurs when a subscriber to one network operator uses the facilities of another operator, such as e.g. when a mobile phone has relocated to another region or another country, where its home operator does not have coverage.

A conventional roaming process when a mobile phone has relocated to a new network involves the following: When the mobile phone is turned on in a new network, or transferred via handover to the new network, the new, visited network detects the phone, notices that it is not registered, and attempts to identify the home network of the mobile phone. If there is no roaming agreement between the home network and the visited network, the mobile phone will be denied services by the visited network. Otherwise, the visited network contacts the home network and requests service information regarding the phone, said information including whether or not the mobile phone is allowed to roam. If the request is successful, the visited network will maintain a temporary subscriber record for the phone, and the home network will update its information to indicate that the phone has relocated to the visited network, allowing a correct routing of information.

The 3GPP provides policy controller discovery between different radio access networks, but in fixed access-networks, e.g. in the fixed broadband world, the principle of equal access leads to a different business model and approach than in the 3GPP. For example, the DSL Forum proposes a policy control architecture composed of a number of separate policy controllers, of which each may belong to a different service provider. However, in the 3GPP, those functions are performed by only one network operator.

SUMMARY

Further, according to the 3GPP, the user identity is associated with a specific network operator, which is not the case in the fixed broadband. One way to break to coupling between the identity and the network operator is the introduction of an entity called Identity Provider IDP, which may be totally independent of any network operator, functioning as a trusted third party. Therefore, a so-called independent Identity Provider is not associated with any network operator, but instead with any other suitable and independent organization, such as e.g. a bank.

Thus, when a user terminal, e.g. a mobile phone or a personal computer, accesses different types of networks, the discovery of policy controllers and the roaming may present a problem.

The object of the present invention is to address the problems outlined above, and to provide an improved policy architecture allowing policy controller discovery between different types of access networks, as well as roaming support, with equal access. This object and others are achieved by the policy control architecture, the individual nodes of the policy control architecture, and the methods in the individual nodes of the policy architecture, according to the appended independent claims.

According to one aspect, the invention provides a policy control architecture for handling policies in communication networks, as well as an independent Identity Provider, a User policy controller and a Business policy controller arranged to function as nodes in such a policy control architecture.

The policy control architecture comprises an independent Identity Provider arranged to generate IDP-user terminal-entries for policy control information, and policy controllers logically divided into policy control units. The policy control units include a User Policy Controller arranged to generate UPC-user terminal-entries for service subscriptions.

The policy control information in the IDP-user terminal entry of the Identity Provider may comprise the address of the User Policy Controller in the home network of the user terminal, and the logically divided policy control units may further include a Business Policy Controller arranged to apply business related policies on service subscriptions. The business related policies of the Business Policy Controller may comprise roaming agreements.

The logically divided policy control units may further include a Service Policy Controller arranged to apply service related policies subscribed services, and a Network Policy Controller arranged to map service policies on network dependent policies, which may be arranged to create network related policies based on network status.

According to another aspect, a method is provided in a user terminal of launching a service in a first home network handled by said policy control architecture. The user terminal performs at least the following steps:
  Receiving an identity from an independent Identity provider before connecting to a first home network;
  Connecting to a first home network and receiving an IP address;
  Subscribing to an available service in the home network;
  Launching the subscribed service in the home network at least once.

When the user terminal launches said service in a second network, the user terminal may perform at least the additional steps of:
  Relocating to a second visited network;
  Performing roaming in the visited network by providing its identity;
  Receiving a list of available services through the Business policy controller;
  Launching said subscribes service, if it is available in the visited network.

An independent Identity Provider within a policy control architecture performs at least the following steps:
  Issuing an identity to a user terminal and generating a corresponding IDP-user terminal entry;
  Performing AAA on the user terminal when it connects to a first home network;
  Storing the address of the User policy controller of the first home network in said IDP-user terminal entry;
  Providing the address of the home-UPC to the Network policy controller when the user terminal launches a subscribed service;
  Performing AAA on the user terminal when it relocates to a second network;
  Providing the address of the home-UPC to the User policy controller of the second network.

A User policy controller within a policy control architecture performs at least the following steps when a user terminal connects to a first home network:
  Generating a UPC-user terminal entry and storing the ID of a subscribed service;
  Accessing the independent Identity Provider and registering its UPC address in the corresponding IDP user terminal entry;
  Storing the address of the Service policy controller associated with the subscribed service in the UPC-user terminal entry;
  Storing the address of the Network policy controller of the home network in the UPC-user terminal entry;

A User policy controller may perform at least the following steps when said user terminal relocates to a second visited network:
  A User policy controller of the second, visited network acquiring the address of the User policy controller of the first, home network via the IDP-user terminal entry;
  The User policy controller of the home network sending the IDs of the user terminals subscribed services to the User policy controller in the visited network;
  The User policy controller of the home network sending the address of the Service policy controller associated with each subscribed service to the corresponding Service policy controller of the visited network;
  A Business policy controller within said policy control architecture applies business related policies on the subscribed services of a roaming user terminal, and said business related policies may include roaming agreements.
  A Service Policy Controller within said policy control applies service related policies on a subscribed service.
  A Network Policy Controller within said policy control architecture maps service policies on network dependent policies, and may create network related policies based on network status.

BRIEF DESCRIPTION OF THE DRAWINGS

The present invention will now be described in more detail and with reference to the accompanying drawings, in which.

DETAILED DESCRIPTION

Figure 1:
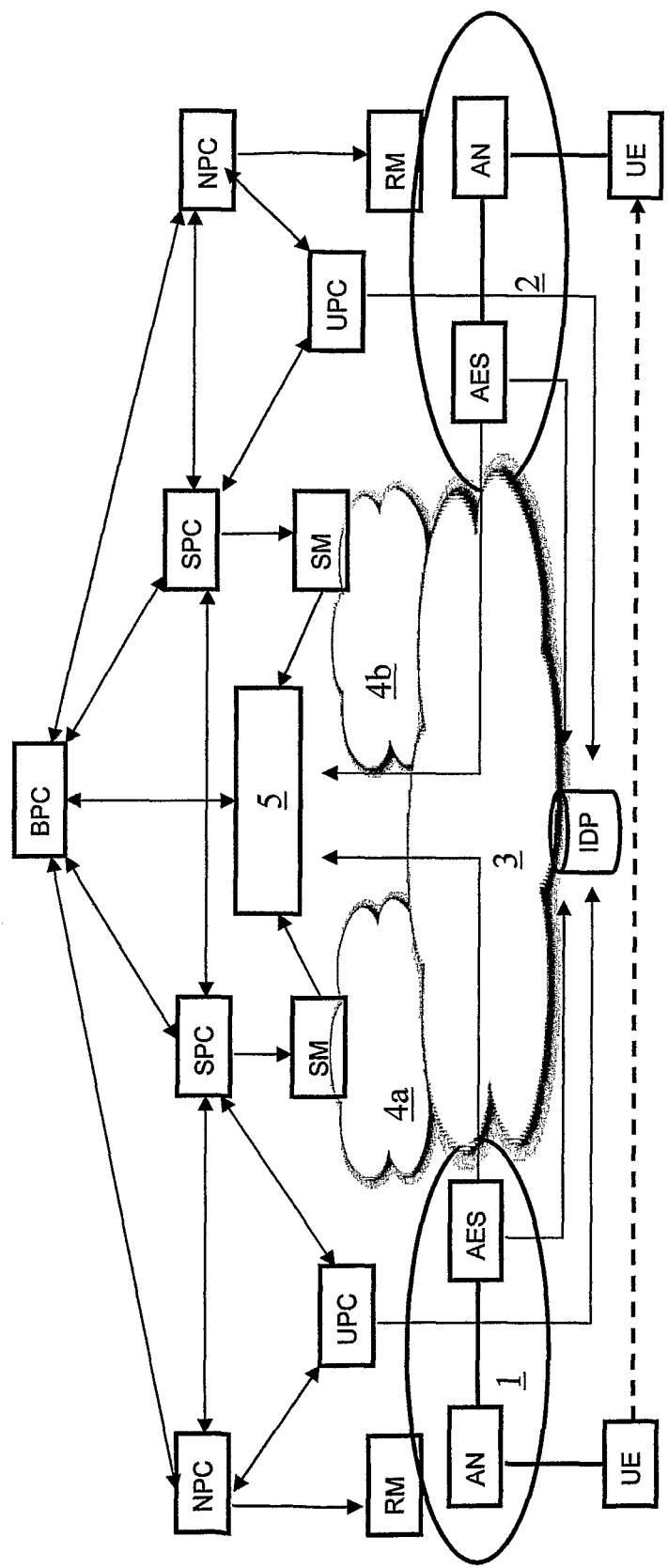
FIG. 1 is a block diagram schematically illustrating a first embodiment of a policy control architecture according to this invention.

In the following description, specific details are set forth, such as a particular architecture and sequences of steps in order to provide a thorough understanding of the present invention. However, it is apparent to a person skilled in the art that the present invention may be practised in other embodiments that may depart from these specific details.

Moreover, it is apparent that the described functions may be implemented using software functioning in conjunction with a programmed microprocessor or a general purpose computer, and/or using an application specific integrated circuit. Where the invention is described in the form of a method, the invention may also be embodied in a computer program product, as well as in a system comprising a computer processor and a memory, wherein the memory is encoded with one or more programs that may perform the described functions.

This invention provides a policy control architecture, comprising a policy controlling function divided into separate policy controlling functional units, e.g. four units, which may be denoted User Policy Controller, Network Policy Controller, Service Policy Controller and Business Policy Controller. Further, the architecture comprises an independent Identity Provider, which is not associated with any network operator, having an added functionality enabling it to function as the anchor and entry point for the policy controller discovery. When a user terminal has been given an identity in a home network, an entry will be created in the independent Identity Provider for this user terminal, and the user terminal is uniquely identified by this identity. When the user terminal first launches a service in its home network, it will first locate its policy controllers, comprising said e.g. four functional units, i.e. the User Policy Controller, Network Policy Controller, Service Policy Controller and Business Policy Controller. After all the policy controllers are found, information will also be pushed to the Identity Provider's entry associated to the specific user terminal. When the user terminal moves to a new location within another network, it will provide its identity to the visited network, which will use the identity to retrieve the Identity Provider. The Identity Provider will provide information regarding the policy controllers to the visited network, enabling the visited network to fetch service subscriptions and to determine whether any business agreement exists between the visited network and the home network, eventually allowing the roaming user terminal to launch said service.

According to the invention, the User Policy Controller UPC and the Business Policy Controller BPC are provided with new functionalities regarding roaming support. When a user terminal subscribes to a service, the subscription information will be added as a user terminal entry in a UPC User information table in the home UPC, together with the identity associated with this service. When the user terminal moves to another network, the Access Edge Site (AES) in the visited network will be able to retrieve the location of the independent Identity Provider IDP, and the Identity Provider will provide the address of the home UPC of the user terminal from the corresponding entry of its IDP User Information table. Thereafter, all related service subscriptions of the user terminal can be fetched from the home UPC, based on the user terminal identity. This information will be sent to the dedicated BPC serving the visited network, which will apply the roaming agreement policies. Thereby, the visited network will learn which services that is available to the user terminal.

A first embodiment of a policy controller architecture according to this invention is illustrated in the block diagram of FIG. 1, provided with separate functional entities related to policy decision making and enforcement, such as e.g. roaming, and all roaming agreement-related policies are controlled by a functional unit denoted Business policy controller BPC.

The figure illustrates a user terminal UE relocating from a first access network 1 to a second access network 2, as well as the policy control architecture enabling roaming of the user terminal in the second access network. The relocation of the user terminal is indicated by the hatched arrow between the two UE-blocks. The figure further illustrates the IP network 3, two service networks 4a, 4b and a Service publish manager 5.

IDP refers to an independent Identity Provider, which is associated with a trusted third party organization and not with any network operator, issuing identities to user terminals and thereby decoupling the user identity from the network operator, enabling an equal access. According to this invention, the independent Identity Provider IDP is provided with an added functionality to act as policy controller discovery anchor point and Identity verification authority.

As illustrated in FIG. 1, the policy controlling function according to this embodiment of the invention is logically divided into four functional units, a Business Policy Controller, a User policy controller, a Network policy controller and a Service policy controller. The Business policy controller and the User policy controller are provided with added functionalities to enable discovery and localization between different types of networks, and to allow roaming.

The BPC in the figure refers to a dedicated Business policy controller, which is responsible for generating business-related policies, such as roaming agreements between networks and SLA:s (Service Level Agreements), which is an agreement between a service provider and a service recipient, and to push them down to the correct policy enforcement point, PEP, e.g. an Access Edge Site, AES.

UPC in the figure refers to the User policy controller, which controls all end-user related policies, among them the user identification, AAA (Authentication, Authorisation, Accounting), billing records, and all subscribed services of the user terminals, and is normally associated with the network operator.

SPC in the figure refers to a Service policy controller, which creates and pushes service related policies to correct policy enforcement point, PEP. Service policies describe the overall business logic that is applied to requests from application servers and peer service policy controllers. The Service policy controller may be a part of the home network, but it can also be a part of a network of an independent service provider.

NPC in the figure refers to a Network policy controller, which has two functions. Firstly, it receives service policies from service policy controllers and maps them onto network dependent policies. Secondly, it creates network related policies based on the existing network status.

RM in the figure refers to a Resource Manager, which manages the resources in the network.

SM in the figure refers to a Service Manager, which is responsible to manage and publish services at the service provider's network.

AES in the figure refers to an Access Edge Site, which acts as policy enforcement point, i.e. "enforces" the policies.

AN in the figure refers to the Access Node of a access network.

UE in the figure refers to a user terminal, which may be e.g. a mobile/cellular phone or a personal computer.

Hereinafter is described how policy controller discovery is performed and how roaming agreements are found and applied according to this invention, covering the steps from before a user terminal connects to a home network until it receives roaming services according to the pre-defined way in a visited network. Some of the individual steps corresponds to the ones in prior art, but the sequences of steps are new, since the Identity Provider IDP, the Business policy controller BPC and the User policy controllers UPCs that are involved in the steps have added functionalities according to this invention.

Before connecting to a network, the user terminal UE must receive an identity from an independent Identity Provider IDP, e.g. in the form of an IMSI (International Mobile Subscriber Identity)-card, or as a user/password pair, which is capable of uniquely identifying this user terminal UE. After subscribing to a service, the user terminal UE has to launch it at least once in the home network before roaming to a visited network.

\* Before a User Terminal UE Connects to a Home Network:

a. The AES (Access Edge Site) gives network information, such as network operator name, to a service publish manager 5. This information can e.g. be added to the name of the AES, such as AES.telia.se.

b. Based on this information, the service publish manager 5 contacts a Business policy controller BPC, which is pre-defined for this service publish manager, and fetches policies regarding the service providers/services having agreement with the network operator.

c. The service publish manager searches its own service directory and sends all available services to the AES.

d. The AES generates a web portal listing all available services.

e. The user terminal UE receives an identity from an independent Identity Provider IDP.

** The User Terminal UE Connects to a Home Network:

a. The user terminal UE sends DHCP-requests which are received by the AES, and the AES sends back a default IP address to the user terminal UE.

b. The user terminal UE is re-directed to the web portal where all available services are listed.

*** The User Terminal UE Subscribes to a Service:

a. The user terminal UE provides its ID (identity) to the AES.

b. The ID is authorized and authenticated by the IDP by means of an AAA.

c. After the AAA, the AES will send the following information to the User policy controller UPC in the home network: UE ID, Subscribed service ID, Address or name of the IDP.

d. Based on the above information, the UPC will generate a UPC User information table with the UE entry for the identity of the user terminal. Under the UE entry, the identities of the subscribed services is registered, together with the addresses of the Service policy controller SPC associated with each subscribed service, as well as the address of the Network policy controller NPC of the home network. Before the user terminal UE launches a service for the first time, the UPC User information table (Table 1) may have the following content:

| UE | NPC | Service | SPC |
|----|-----|---------|-----|
| ID | Empty | ServiceID1 | empty |
|    |       | ServiceID2 | empty |
|    |       | ... | ... |
|    |       | ServiceIDn | empty | d. The User policy controller UPC then accesses the UE entry in the IDP User information table on the independent Identity Provider IDP, and registers itself in the same entry, creating an UE-ID—UPC pair. In the independent Identity Provider IDP, said IDP User information table is kept for all users/devices that receive Ids from this independent Identity Provider IDP, together with their home UPC address, and an example of the content in this table is indicated below, denoted Table 2:

| UE | UPC |
|----|-----|
| ID1 | Address |
| ID2 | Address |
| ... | ... |
| IDn | Address | e. The user terminal UE receives a real IP address.

**** The User Terminal UE Launches a Service:

a. The user terminal UE and an application server (not shown in FIG. 1) find the same Service policy controller SPC by using a pre-defined algorithm, e.g. by a suitable signalling negotiation, which is well-known to the skilled person.

b. The Service policy controller SPC uses the UE's ID to access the IDP, and to fetch the corresponding UPC address from the IDP User information table.

c. The Service policy controller SPC registers its SPC address in the UPC User information table under the specific UE entry and Service ID.

d. The AES provides the UE ID to its Network policy controller NPC, which may be pre-defined for the AES or found via DNS-query.

d. The Network policy controller NPC fetches the UPC address from the IDP User information table.

e. The Network policy controller NPC registers its NPC address in the UPC User information table.

After these steps, the conventional service negotiation and signalling will continue, based on service type. After the user terminal UE has launched several services, the UE entry in the UPC User information table in the User policy controller UPC may correspond to the following Table 3:

| UE | NPC | Service | SPC |
|----|-----|---------|-----|
| ID | Address | ServiceID1 | Address-1 |
|    |         | ServiceID2 | Address-2 |
|    |         | ... | ... |
|    |         | ServiceIDn | Address-n |

When the signalling process is completed, the user terminal UE can start using the service.

***** The User Terminal UE Relocates to a Second (Visited) Network:

a. The user terminal UE connects to the visited network, and provides its ID.

b. The visited AES retrieves the address of the independent Identity Provider IDP based on the UE ID information, e.g. by means of a DNS-query.

c. The independent Identity Provider IDP performs AAA over the user terminals ID. Thereafter, the user terminal home UPC address is fetched from the UE entry of the IDP User information table and sent back to the visited AES, enabling the User policy controller UPC of the visited network to acquire the address of the home User policy controller UPC.

d. The home UPC returns the service IDs of the subscribed services of the user terminal UE to the User policy controller UPC and the AES in the second, visited network, the service ID of a subscribed service comprising information regarding the service provider.

e. The visited AES communicates with the dedicated Business policy controller BPC via the service publish manager 5.

f. The Business policy controller BPC checks for each service provider if there is a business agreement between the service provider and the visited network. If a business agreement exists, the service can be used by the roaming user terminal UE, otherwise the user terminal UE will be denied the service.

g. The visited AES returns a list of available services to the roaming user terminal UE.

****** The User Terminal UE Launches a Service from the Visited Network:

The steps a, b, c are the same as in the previous sequence of steps, by which the visited network finds the home UPC. The only difference is that the visited AES returns not only the UE ID, but also the service ID relating to service that the roaming user terminal UE wants to launch.

d. The home UPC locates the user terminals entry from its UPC User information table, and finds the address of the Service policy controller SPC associated with the specific service that the roaming user terminal UE wants to launch.

e. Thereby, the visited SPC and AES discover the address of the SPC associated with the service of the roaming user terminal UE. The visited AES can fetch policies regarding this service, or the visited Service policy controller SPC can contact the Service policy controller SPC associated with the service for policies.

After these steps, the service proceeds in the conventional way.

Figure 2:
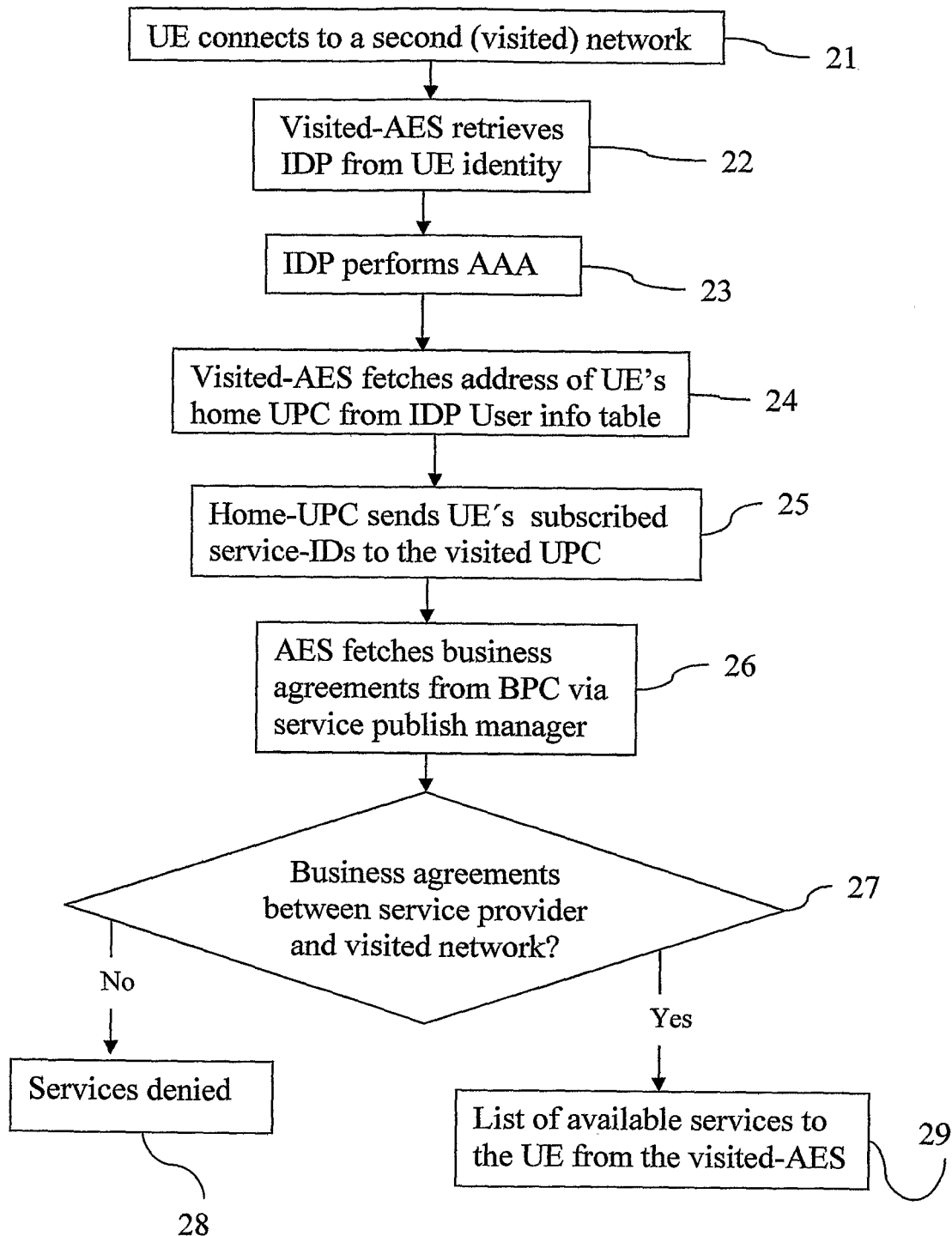
FIG. 2 is a flow chart illustrating the performed steps when a user terminal relocates to a second, visited network.

In order to further explain and clarify the present invention, the steps performed when a user terminal relocates to a new network is illustrated in the flow chart in FIG. 2.

In step 21, the UE connects to the new, second network, and provides its ID. In step 22, the AES in the visited network retrieves the IDP based on the UE identity, via e.g. DNS-query.

In step 23, the IDP performs AAA over the UE's ID, and the address of the UPC in the home network is fetched from the IDP's UE entry in the IDP User information table in step 24, and sent back to the visited AES. Thereby, the UPC of the visited network acquires the address of the home UPC.

The home UPC sends, in step 25, the ID of the UE's subscribed service back to the UPC and AES in the visited network, the service ID comprising information regarding the service provider.

In step 26, the visited AES communicates with the BPC via the service publish manager 5, and the BPC determines, in step 27, for each service provider if there is a business agreement between the service provider and the visited network. If business agreement exists, the service may be used by the roaming UE, otherwise the UE will be denied the service, in step 28. The visited AES returns a list of available services to the roaming UE in step 29.

Figure 3:
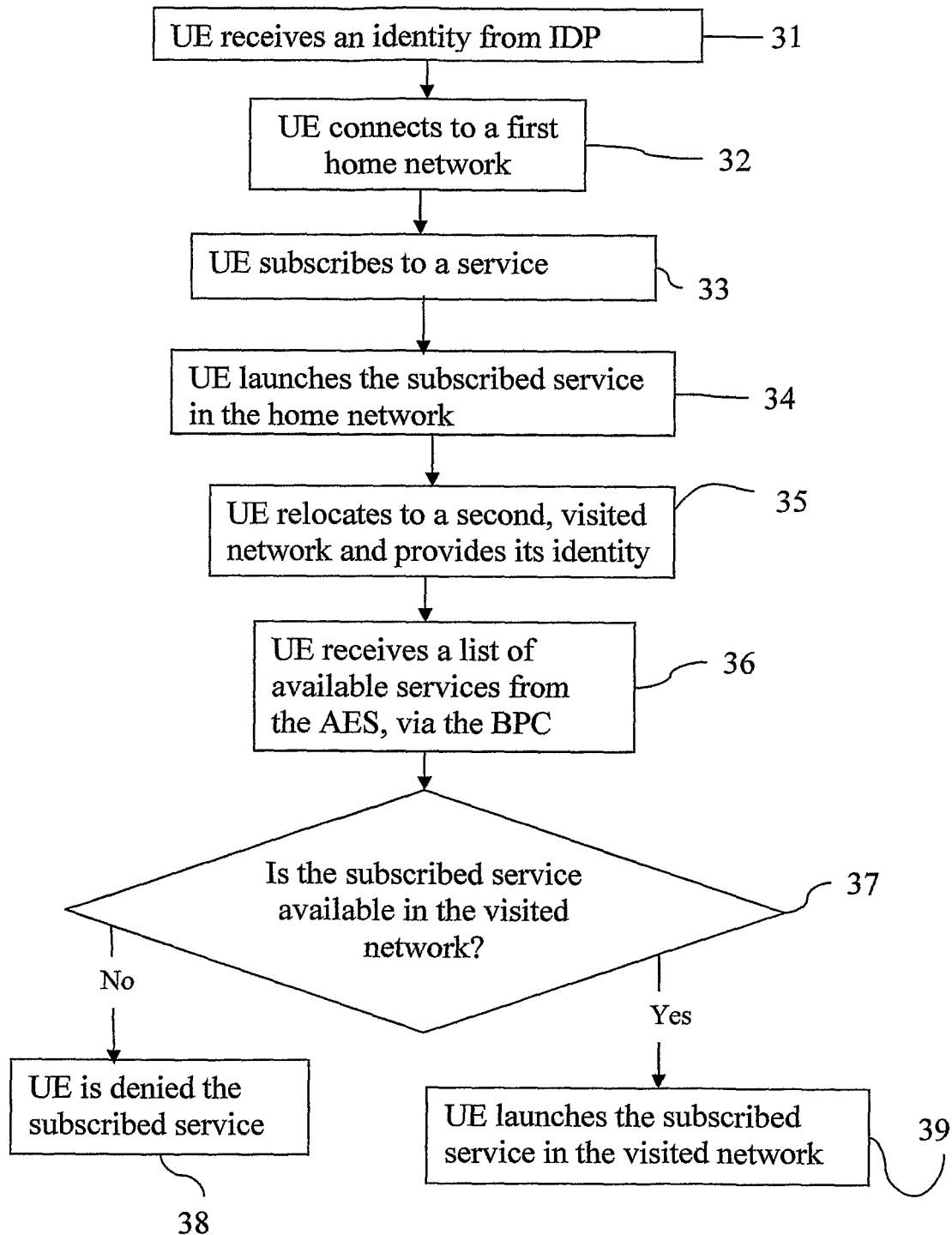
FIG. 3 is a flow chart illustrating an exemplary embodiment of a method in a user terminal in a policy control architecture according the invention.

FIG. 3 is a flow chart illustrating an exemplary embodiment of a method of a user terminal in a policy control architecture according to this invention, the flow chart comprising at least some of the steps performed by a user terminal from before connecting to a first network, until it launches a subscribed service in a second network.

In step 31, a user terminal registers with an independent Identity provider, IDP, and receives an identity, such as e.g. an IMSI-card or a password. Thereafter, in step 32, the user terminal connects to a first network 1, i.e. the home network, and provides its identity in order to subscribe to an available service, in step 33. The User terminal launches the subscribed service in step 34, and thereafter relocates to a second network 2, i.e. the visited network, providing its ID. In step 36 the user terminal receives a list of available services in the visited network from the AES of the visited network. The AES has obtained this information from a dedicated Business policy controller, via the service publish manager 5. If it is determined in step 37 that the subscribed service of the user terminal is available in the visited network, the user terminal launches the service, in step 39, otherwise the User terminal is denied to launch the service, in step 38.

Figure 4:
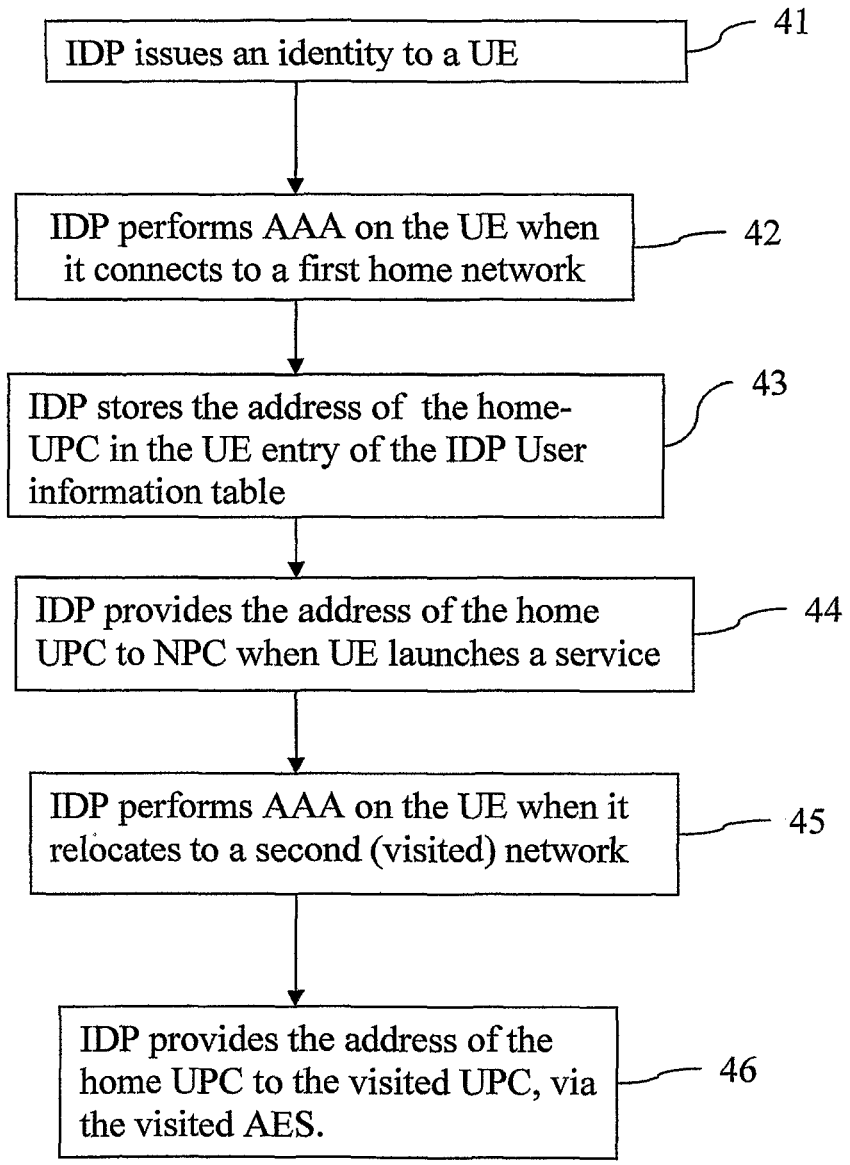
FIG. 4 is a flow chart illustrating an exemplary embodiment of a method in an independent Identity Provider within a policy control architecture according the invention.

FIG. 4 is a flow chart illustrating an exemplary embodiment of the method of an independent Identity Provider within a policy control architecture according to this invention. The flow chart comprises at least some of the steps performed by an independent Identity provider IDP from before a UE connects to a first network, until the UE relocates a second (visited) network.

In step 41, the independent Identity provider issues an identity to a user terminal UE, and when this user terminal connects to a first network 1, i.e. the home network, the IDP performs AAA on the user terminal, in step 42. In step 43, the IDP stores the address of the UPC of the UE's home network in its IDP user information table. This step is performed by said home UPC accessing the UE entry in the IDP User information table and registering itself. When the user terminal launches a subscribed service in the home network, the IDP provides the address of the home UPC to the home Network policy controller NPC, in step 44, which is performed by the NPC fetching the home UPC address form the IDP.

When the user terminal relocates to a second network 2, i.e. a visited network, the IDP performs AAA on the user terminal, in step 45, and further provides the address of the home UPC to the visited UPC via the visited AES, in step 46.

Figure 5:
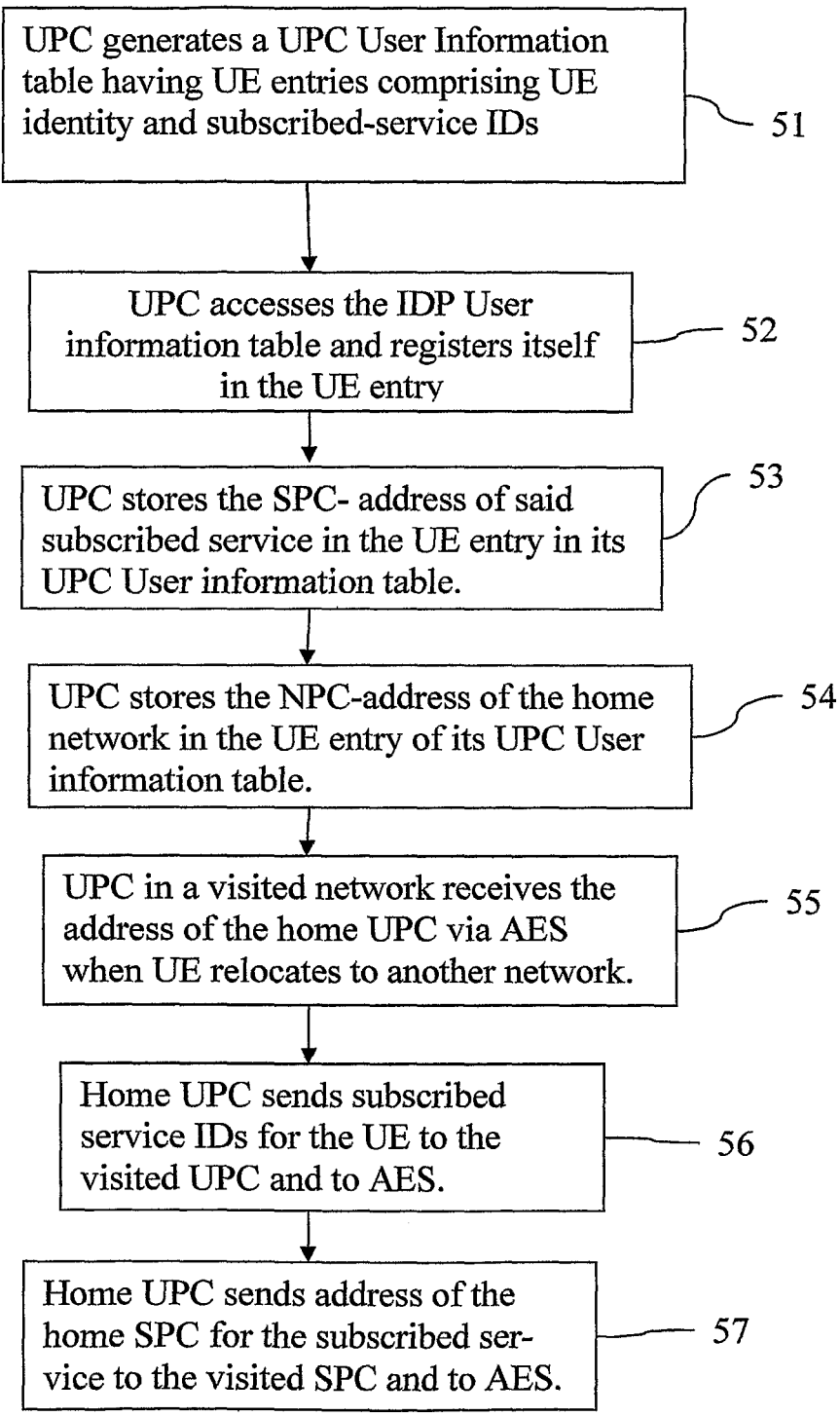
FIG. 5 is a flow chart illustrating an exemplary embodiment of a method in a User Policy Controller within a policy control architecture according to the invention.

FIG. 5 is a flow chart illustrating an exemplary embodiment of a method of a User policy controller UPC within a policy control architecture according to this invention. The flow chart comprises at least some of the steps performed by a User policy controller UPC from when a UE is connected to a first network 1, until the UE may launch a subscribed service in a second (visited) network.

In step 51, the User policy controller generates a UPC User information table with an entry for the UE identity. Under the UE entry, the identities of the subscribed services can be registered, together with the addresses of the Service policy controller SPC associated with each subscribed service, as well as the address of the Network policy controller NPC of the home network. Since the UPC receives the UE identity, the subscribed service ID and the address or name of the IDP when the UE subscribes to a service, the ID of the subscribed service is added under the UE entry in the UPC User information table (Table 1).

In step 52, the UPC accesses the IDP User information table (Table 2) and registers its address under the UE entry, creating a UE-ID—UPC pair. In step 53, the UPC stores the address of the Service policy controller SPC associated with the subscribed service of the UE in its UPC User information table, and in step 54 the UPC stores the address of the Network policy controller NPC of the home network, thereby completing the UE entry in the UPC User information table.

When the user terminal relocates to a second (visited) network 2, the UPC in the visited network receives the address of the home UPC via the visited AES and the IDP user information table, in step 55. Thereby, the home UPC is able to retrieve user terminal-information from its UPC User information table and send the subscribed service-IDs for the roaming user terminal to the visited UPC, in step 56, the subscribed service ID comprising information relating to the service provider.

Further, the home UPC retrieves the address of the Service policy controller SPC associated with the subscribed services of the user terminal from its UPC User information table, and sends it to the corresponding Service policy controller SPC of the visited network, in step 57, eventually enabling the user terminal to launch a subscribed service in the visited network.

Thus, the present invention uses an independent Identity Provider, a Business policy controller and a User policy controller provided with added functionalities for enabling policy controllers in different types of networks to locate each other, and to support roaming of a user terminal moving between different types of networks, such as relocating e.g. from a fixed access networks to a radio access networks.

Thereby, the invention provides an improved policy control localization and roaming support when a user terminal relocates to an access network of a different type. By giving an independent Identity Provider the new functionalities according to this invention, the significance of the independent Identity Provider as an independent trust third party is strengthened. This is the one of the key steps towards a more loosely coupled network architecture that is capable of providing services to users based on the principal of equal access.

While the invention has been described with reference to specific exemplary embodiments, the description is in general only intended to illustrate the inventive concept and should not be taken as limiting the scope of the invention.

The invention claimed is:

1. A policy control architecture for controlling policies between a cellular radio access network and a fixed access network, said policy control architecture comprising: an independent Identity Provider (IDP) comprising a processor coupled to a non-transitory memory, the IDP serving as a centralized policy controller discovery anchor point for both the cellular radio access network and the fixed access network, wherein the IDP is independent of the radio access network and the fixed access network and is configured to assign an identity to a user terminal and to generate a corresponding IDP-user terminal-entry for the user terminal before the user terminal connects to the radio access network or the fixed access network; and a plurality of network-based policy controllers, each controller comprising a processor coupled to a non-transitory memory, wherein the plurality of network-based policy controllers includes a first User Policy Controller (UPC) of the cellular radio access network that enforces policies providing priority to cellular network subscribers and a second UPC of the fixed access network that enforces equal-access policies for all users, wherein when the user terminal connects to the cellular radio access network and launches a subscribed service, the first UPC is configured to: generate a UPC-user terminal-entry including an identity (ID) of the subscribed service; and send address information of the first UPC to the independent IDP for storage in the corresponding IDP-user terminal entry; wherein when the user terminal relocates from the cellular radio access network to the fixed access network, the second UPC is configured to: utilize the identity of the user terminal to access the corresponding IDP-user terminal-entry in the independent IDP to retrieve the address of the first UPC; and obtain policy control information relating to the user terminal and the subscribed service from the first UPC.

2. The policy control architecture according to claim 1, wherein the plurality of network-based policy controllers also include a Business Policy Controller (BPC) configured to apply business related policies on service subscriptions.

3. The policy control architecture according to claim 2, wherein the business related policies of the Business Policy Controller include roaming agreements.

4. The policy control architecture according to claim 1, wherein the plurality of network-based policy controllers also include a Service Policy Controller (SPC) for each network for applying service related policies to subscribed services.

5. The policy control architecture according to claim 1, wherein the plurality of network-based policy controllers also include a Network Policy Controller (NPC) for each network configured to map service policies on network dependent policies.

6. The policy control architecture according to claim 1, wherein the UPC-user terminal-entry created by the first UPC also includes an address of a Service Policy Controller (SPC) associated with the subscribed service, and an address of a Network Policy Controller (NPC) of the cellular radio access network.

7. The policy control architecture according to claim 1, wherein the independent IDP is also configured to authenticate and authorize the user terminal with an Authentication, Authorization, and Accounting (AAA) server when the user terminal connects to the cellular radio access network or the fixed access network.

8. A policy control architecture for controlling policies between a cellular radio access network and a fixed access network, said policy control architecture comprising: an independent Identity Provider (IDP) comprising a processor coupled to a non-transitory memory, the IDP serving as a centralized policy controller discovery anchor point for both the cellular radio access network and the fixed access network, wherein the IDP is independent of the cellular radio access network and the fixed access network and is configured to assign an identity to a user terminal and to generate a corresponding IDP-user terminal-entry for the user terminal before the user terminal connects to the cellular radio access network or the fixed access network; and a plurality of network-based policy controllers, each controller comprising a processor coupled to a non-transitory memory, wherein the plurality of network-based policy controllers includes a first User Policy Controller (UPC) of the cellular radio access network that enforces policies providing priority to cellular network subscribers and a second UPC of the fixed access network that enforces equal-access policies for all users, wherein when the user terminal connects to the fixed access network and launches a subscribed service, the second UPC is configured to: generate a UPC-user terminal-entry including an identity (ID) of the subscribed service; and send address information of the second UPC to the independent IDP for storage in the corresponding IDP-user terminal entry; wherein when the user terminal relocates from the fixed access network to the cellular radio access network, the first UPC is configured to: utilize the identity of the user terminal to access the corresponding IDP-user terminal-entry in the independent IDP to retrieve the address of the second UPC; and obtain policy control information relating to the user terminal and the subscribed service from the second UPC.

9. An independent Identity Provider (IDP) comprising a processor coupled to a non-transitory memory, the IDP serving as a centralized policy controller discovery anchor point for a first access network and a second access network, wherein one of the access networks is a cellular radio access network that enforces policies providing priority to cellular network subscribers and the other access network is a fixed access network that enforces equal-access policies for all users, wherein the IDP is independent of the first and second access networks and is configured to: assign an identity to a user terminal and to generate a corresponding IDP-user terminal-entry for the user terminal before the user terminal connects to the first or second access networks; interface with a plurality of network-based policy controllers including a first User Policy Controller (UPC) of the first access network and a second UPC of the second access network; receive and store in the IDP-user terminal-entry, address information for the first UPC when the user terminal first connects to the first access network; and send the stored address information for the first UPC to the second UPC upon request when the user terminal relocates from the first access network to the second access network and wherein the second UPC obtains policy control information relating to the user terminal and a launched subscribed service from the first UPC.

10. The independent IDP according to claim 7, wherein the independent IDP is also configured to authenticate and authorize the user terminal with an Authentication, Authorization, and Accounting (AAA) server when the user terminal connects to the cellular radio access network or the fixed access network.

11. A method in an independent Identity Provider (IDP) serving as a centralized policy controller discovery anchor point for a first access network and a second access network, wherein one of the access networks is a cellular radio access network that enforces policies providing priority to cellular network subscribers and the other access network is a fixed access network that enforces equal-access policies for all users, wherein the IDP is independent of the first and second access networks, the method comprising the steps of: assigning an identity to a user terminal and generating a corresponding IDP-user terminal-entry for the user terminal before the user terminal connects to the first or second access networks; receiving and storing in the IDP-user terminal-entry, address information for a first User Policy Controller (UPC) of the first access network when the user terminal first connects to the first access network; receiving a request for the stored address information from a second UPC of the second access network when the user terminal relocates from the first access network to the second access network; and sending the stored address information for the first UPC to the second UPC in response to the request from the second UPC and wherein the second UPC obtains policy control information relating to the user terminal and a launched subscribed service from the first UPC.

12. The method according to claim 11, further comprising the steps of:
   authenticating and authorizing the user terminal with an Authentication, Authorization, and Accounting (AAA) server when the user terminal connects to the first access network; and
   notifying the AAA server when the user terminal relocates from the first access network to the second access network.

13. The method according to claim 11, further comprising the steps of:
   receiving a request for the stored address information from a Network Policy Controller (NPC) of the first network when the user terminal launches a subscribed service in the first network; and
   sending the stored address information for the first UPC to the NPC of the first network in response to the request from the NPC.

14. In a first User Policy Controller (UPC) of a first access network, a method of controlling policies for a user terminal that connects to the first access network, subscribes to a service, and then relocates to a second access network, wherein one of the access networks is a cellular radio access network that enforces policies providing priority to cellular network subscribers and the other access network is a fixed access network that enforces equal-access policies for all users, the method comprising the steps of: when the user terminal subscribes to the service: receiving from an Access Edge Site (AES) of the first access network, an identity of the user terminal assigned by an independent Identity Provider (IDP), an identity of the subscribed service, and an address of the independent IDP serving as a centralized policy controller discovery anchor point for the first and second access networks, wherein the IDP is independent of the first and second access networks; storing the identity of the user terminal, the identity of the subscribed service, and the address of the independent IDP in a UPC user information table associated with the user terminal; and sending address information for the first UPC to the independent IDP for storage in an IDP-user terminal-entry; when the user terminal launches the subscribed service: receiving from a first Service Policy Controller (SPC) that controls policies for the subscribed service in the first access network, an address for the first SPC; storing the address for the first SPC in the UPC user information table; receiving from a Network Policy Controller (NPC) that controls policies for the first access network, an address for the NPC; and storing the address for the NPC in the UPC user information table; and when the user terminal relocates to the second access network: receiving from a second UPC of the second access network, a request for policy control information relating to the user terminal and the identity of the subscribed service, subsequent to the second UPC requesting and receiving the stored address information for the first UPC from the IDP; sending the identity of the subscribed service to the second UPC; and sending the address for the first SPC to a second SPC of the second access network.

* * * * *

UNITED STATES PATENT AND TRADEMARK OFFICE
CERTIFICATE OF CORRECTION

| | | |
|---|---|---|
| PATENT NO. | : 8,983,457 B2 | Page 1 of 1 |
| APPLICATION NO. | : 12/442743 | |
| DATED | : March 17, 2015 | |
| INVENTOR(S) | : Zhao | |

It is certified that error appears in the above-identified patent and that said Letters Patent is hereby corrected as shown below:

In the Specification

In Column 8, Line 10, delete "d. The Network" and insert -- e. The Network --, therefor.

In Column 8, Line 12, delete "e. The Network" and insert -- f. The Network --, therefor.

Signed and Sealed this
Sixteenth Day of February, 2016

Michelle K. Lee
*Director of the United States Patent and Trademark Office*